United States Patent [19]

Brennan

[11] Patent Number: 4,488,822
[45] Date of Patent: Dec. 18, 1984

[54] TIME/TEMPERATURE INDICATOR

[75] Inventor: Timothy A. Brennan, Andover, Mass.

[73] Assignee: Andover Monitoring Systems Corporation, Andover, Mass.

[21] Appl. No.: 336,834

[22] Filed: Jan. 4, 1982

[51] Int. Cl.³ .............................................. G01K 3/00
[52] U.S. Cl. .................................... 374/101; 374/102; 116/217
[58] Field of Search ................... 426/87, 88; 374/101, 374/102, 104, 159, 160, 201, 202, 143, 187; 116/216, 217, 206, 207, 218; 138/32

[56] References Cited

U.S. PATENT DOCUMENTS 3,820,499  6/1974  Kliewen et al. ..................... 116/217
3,965,741  6/1976  Wachtell et al. ..................... 374/102

FOREIGN PATENT DOCUMENTS 526378  10/1921  France ................................ 374/201
362547   7/1962  Switzerland ........................ 374/202

Primary Examiner—Steven L. Stephan
Assistant Examiner—David R. Schuster
Attorney, Agent, or Firm—Abraham Ogman

[57] ABSTRACT

This invention is directed to a time/temperature indicator wherein a fluid is frozen in one compartment and subjected to the pressure of a compressible fluid through a flow control device. When the frozen fluid melts, it is forced from its compartment and the time/-temperature indicator at a control rate by the compressible fluid acting through the flow controlled device.

7 Claims, 2 Drawing Figures

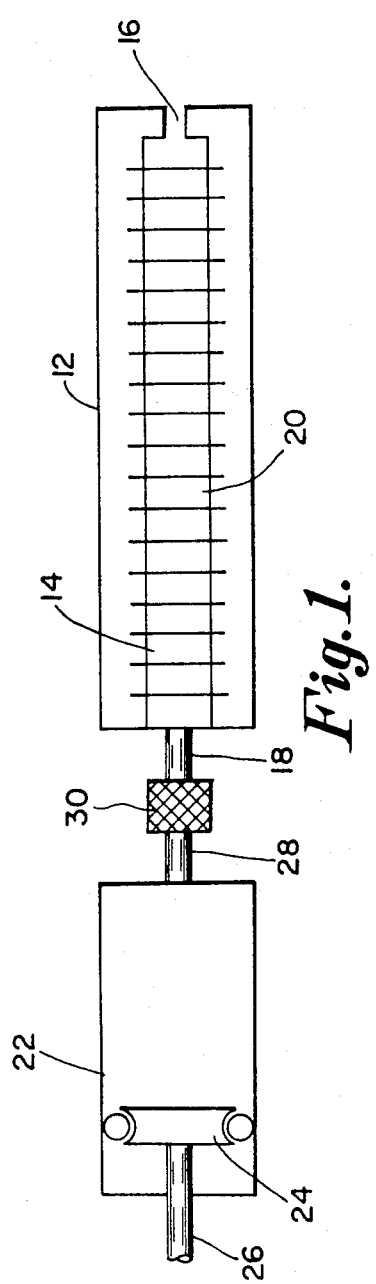
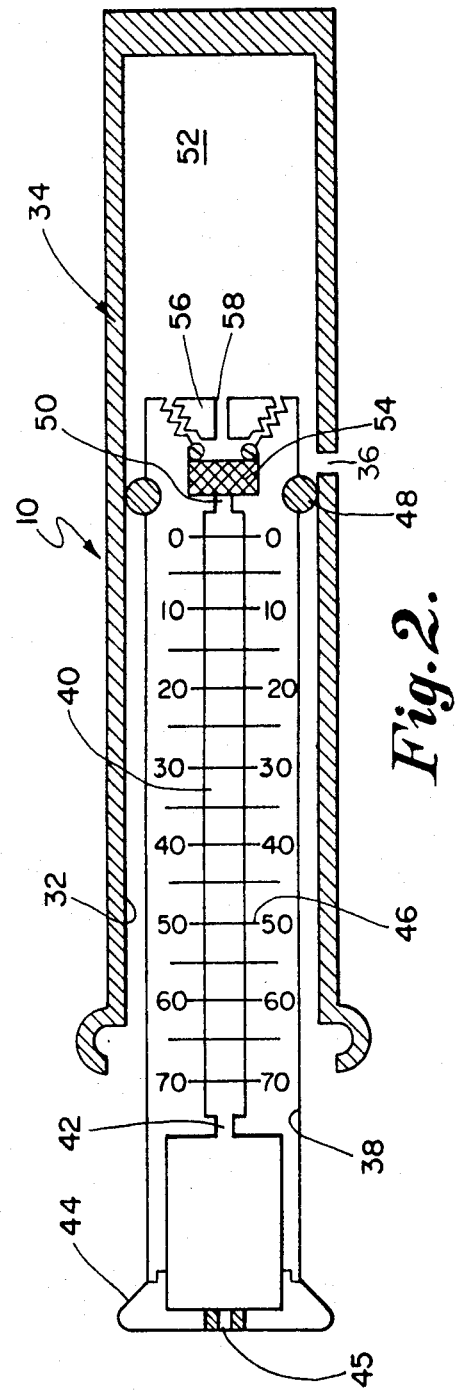

TIME/TEMPERATURE INDICATOR

BACKGROUND OF THE INVENTION

There is a need for an economical disposal device that will give an indication of the time at temperature that could be placed with time/temperature sensitive products to monitor the time that an environment exceeds a predetermined temperature. There are, at the present time, a number of disposal devices that give a permanent indication when a specific temperature has been reached, but nothing that gives an indication to time. There are expensive temperature recording devices that do record temperature on a time basis such as strip chart recorders. These are too costly to be considered for individual carton or container use.

The proposed device is constructed in such a manner that an indication of the time above a specific temperature can be determined. This indication is timed by using the flow of air or another compressible fluid through a flow control means such as a filter to displace a fluid situated in a scale column.

SUMMARY OF THE INVENTION

In accordance with the invention, the time/temperature indicator includes a first compartment having input and output spaced-apart passages and a closure for the output passage. A freezable fluid having a predetermined freezing point is stored in the first compartment.

A second compartment containing a compressible fluid is also provided. The second compartment includes an exit passage in fluid communication through a flow control means with the input passage.

The first compartment includes additional means to measure the volume of the fluid contained in the compartment. Finally, means is provided for pressurizing the compressible fluid so that it can, when permitted to do so, force fluid from the first compartment at a controlled rate.

It is an object of the present invention to provide an inexpensive device which indicates the time an environment exceeds a predetermined temperature.

It is another object of the present invention to provide a time/temperature indicator which utilizes a liquid having a predetermined freezing point, which fluid is forced out of the indicator at a controlled rate to indicate the time the indicator was in an environment, the temperature of which exceeded the melting point of the liquid.

It is yet another object of the present invention to provide a time/temperature indicator utilizing the controlled flow of a fluid at or above a predetermined temperature to indicate the time an indicator is above the freezing point of the fluid.

Other objects, features, details, uses, and advantages of the invention will become apparent from the embodiments thereof presented in the following specification, claims, and drawing.

BRIEF DESCRIPTION OF THE DRAWING

FIG. 1 is a schematic representation of the time/temperature indicator useful for explaining the broad concept of the time/temperature indicator; and FIG. 2 is an illustration of the preferred embodiment of a time/temperature indicator.

DESCRIPTION OF THE ILLUSTRATED EMBODIMENTS

Referring to FIG. 1, there is represented a tubular housing 12 containing center column 14 having an exit passage 16 at one end. Spaced from the exit passage 16 is an input passage 18. The housing also includes indicia 20 which are spaced along the length of column 14.

On the left-hand side of FIG. 1, there is a pressure chamber 22 which contains an internal piston 24 which can be operated via the rod 26 from the outside of the pressure chamber. The pressure chamber is in fluid communication with the input passage 18 by means of an exit passage 28 and a flow control means 30. The time/temperature indicator operates in the following manner.

The scaled column is filled with a material that "melts" at a specific temperature, e.g., water when the device was to be used to monitor time above 32 F. (freezing temperature). Prior to use, this unit is placed in a freezer to cause the fluid (water) to freeze (solidify). The device is removed from the freezer and the plunger depressed causing an overpressure in the pressure chamber. This overpressure is gradually reduced by the flow of air through the flow control means 30. This flow will continue until the pressure was equalized on either side of the filter plug.

Due to the solidified fluid in the scaled column, the volume of air in the scaled column side of the filter plug is much lower causing a reservoir of stored compressed air in the pressure chamber 22.

If the device is then placed in an environment where the temperature is above the melting point of the material in the scaled column, the airflow through the filter plug will displace the now liquid material in the column 14 rendering an indication of the time above the specific (in this case, 32 F.) temperature, assuming the indicia 20 indicates time rather than volume of fluid displaced. If the environment was to again go below the solidifying temperature of the material, the flow would stop, but the area where the fluidized material had been displaced gives a permanent record of the time above the fluidizing temperature. If the environment was to again go above the specific melting temperature of the material, the airflow will start to displace the fluid again allowing an integrated reading of the total time above the specific fluidizing temperature.

It is also proposed that the material in the scaled column can encompass a wide range of temperature from the freezing temperature −50 F. through the refrigerated ranges 38 F. to 100 F. and up to autoclaving 250 F. temperatures. The operation over these ranges will be basically the same as with the referenced freezing (32 F.) temperature through the judicious selection of fluids for column 14.

The preferred embodiment of the invention is as shown in FIG. 2. The time/temperature indicator 10 resembles a hypodermic syringe in that it contains a tubular wall 32 defining a housing 34 which is closed at one end. An intermediate opening 36 is defined within the wall adjacent to the closed end.

Spaced within the housing is a piston-like device, including a tubular piston 38 shaped to conform to the interior of the housing 34 and capable of reciprocating relative to the housing 34. The piston 38 contains a central column 40 for containing a fluid. The central column 40 includes an exit passage 42 which is closed by means of a cap 44. Indicia 46 are spaced along the central column 40. An O-ring 48 is used to seal the exterior of the piston 38 to the interior of the tubular wall 32 of the housing 34. An entrance 50 to the central column 40 is in fluid communication with a pressure chamber 52 formed between the housing and the piston through a filter 54. The filter 54 is maintained within the piston 38 by means of a threaded closure 56 containing a center passage 58.

The FIG. 2 time/temperature indicator operates in the following manner. A freezable fluid is placed within the central column 40 of the piston 38 and frozen. The piston is then moved to the right past the opening 36 to increase the pressure within the pressure chamber 52 to a predetermined amount. The piston is then secured against moving relative to the housing 34 by any suitable means (not shown). After the fluid within the central column 40 is frozen, the cap 44 may be removed or alternatively, a passage 45 opened through the cap 44. When the frozen fluid melts, the pressure within the pressure chamber 52 forces air through the filter 54 into a central column 40. The air dispaces the melting liquid to the left and out of the piston through the passage 42 or the passage 45, as the case may be. The rate that air flows from pressure chamber 52 into the central column 40 is controlled by the filter 54. The flow of air is coordinated with the indicia 46 so that a predetermined volume of fluid is displaced from the column per unit of time.

It follows, therefore, that in order to determine the time at which the indicator was exposed to an environment above the freezing point above the fluid containing the central column, it is merely necessary to know the time indicated by the indicia relative to the amount of fluid that was displaced.

The time/temperature indicator can be inexpensively manufactured. It is versatile in that the temperature range over which it can operate is determined solely by the freezable liquid used. It can be sold in hot form with a variety of freezable liquids enabling the use to choose one of several available freezable liquids. It needs no ancillary instruments or equipment to prepare it for use.

Its principal benefit is the time/temperature feature which will work with a steady-state environmental change or an interrupted temperature environment.

Its uses are many: Frozen food shipments and temperature-controlled medical and biological shipments.

It is small enough to be included in food, dairy, etc. shipments for verification of specified time/temperature environments.

The various features and advantages of the invention are throught to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:
1. A time/temperature indicator comprising:
   a first compartment having an input passage and a spaced-apart exit passage;
   a freezable fluid filling said first compartment;
   a second compartment having pressurizing means, a second exit passage in fluid communication with said first input passage, and a compressible fluid in said second compartment; and
   means for controlling the flow of compressible fluid from said second compartment to said first compartment.
2. A structure as set forth in claim 1 wherein there is indicia means to measure the volume of compressible fluid in said first compartment.
3. A structure as set forth in claim 1 wherein means for controlling the flow of compressible fluid from said second compartment to said first compartment is a filter intermediate of said second exit passage and said first input passage.
4. A structure as set forth in claim 1 wherein there are piston means complementing said second compartment configured to form a piston and cylinder for pressurizing said compressible fluid in said second compartment.
5. A time/temperature indicator comprising:
   a pressure chamber comprising a tubular wall closed at one end with an intermediate opening defined through said wall;
   a tubular piston for containing a freezable fluid configured to fit within said tubular wall and to move longitudinally relative to said tubular wall to compress a compressible fluid in said pressure chamber;
   said piston having a closed end adjacent to said closed end of the tubular wall having a passage defined through said closed end in fluid communication with said pressure chamber;
   control means positioned in said passage of said piston for controlling the flow of compressible fluid from said pressure chamber to the interior of said piston; and
   indicia means on said piston for indicating the volume of freezable fluid in said piston.
6. A time/temperature indicator as defined in claim 5 wherein said tubular wall and piston are cylindrical and said means is an "O" ring.
7. A time/temperature indicator as defined in claim 6 wherein the fluid flow control means is a filter.

* * * * *

UNITED STATES PATENT AND TRADEMARK OFFICE
CERTIFICATE OF CORRECTION

PATENT NO. : 4,488,822

DATED : December 18, 1984

INVENTOR(S) : Timothy A. Brennan

It is certified that error appears in the above–identified patent and that said Letters Patent are hereby corrected as shown below:

Claim 2, line 2, please change "compressible" to --freezable--.

Signed and Sealed this

Fourteenth Day of May 1985

[SEAL]

*Attest:*

DONALD J. QUIGG

*Attesting Officer*  *Acting Commissioner of Patents and Trademarks*